Aug. 30, 1927.

M. H. BALLARD 1,640,871

STARTING AND STOPPING MECHANISM

Filed Jan. 25, 1923

INVENTOR.
Milton H. Ballard

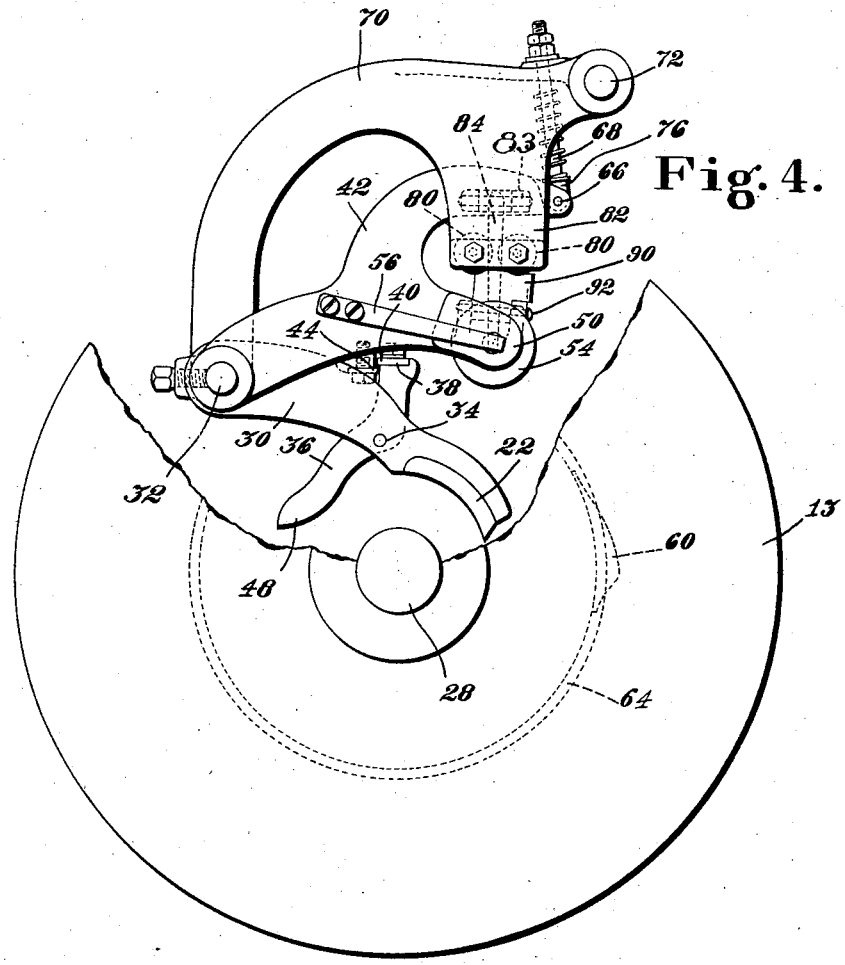

Patented Aug. 30, 1927.

1,640,871

UNITED STATES PATENT OFFICE.

MILTON H. BALLARD, OF LYNN, MASSACHUSETTS, ASSIGNOR TO UNITED SHOE MACHINERY CORPORATION, OF PATERSON, NEW JERSEY, A CORPORATION OF NEW JERSEY.

STARTING AND STOPPING MECHANISM.

Application filed January 25, 1923. Serial No. 614,905.

This invention relates to starting and stopping mechanisms for machines and more particularly to controlling means for this class of mechanisms.

It is an object of the invention to provide electrical controlling means for the starting mechanisms of machines so constructed and arranged as to require the expenditure of a minimum of electrical energy and at the same time maintain the highest standard of efficiency for the purposes intended.

With the above object in view the invention provides improved means for conditioning the starting mechanism of a machine through manually controlled means so that said mechanism may be operated by power furnished by a continuously moving part of the machine, such, for example, as the power pulley on the main shaft. As shown, the manually controlled means comprises a magnet in an electrical circuit operative to move a relatively light member into position to furnish an operative connection between the starting mechanism and the power pulley whereby the latter operates the former. In the illustrative construction the invention is applied to a one-revolution, non-repeating type of clutch, means being provided for preventing the repetition of the clutching operation in the event that the operator carelessly or inadvertently holds the switch in the electrical circuit closed much beyond the time necessary to effect a single clutching operation.

Other features of the invention and novel combinations of parts will be described in the detailed specification and pointed out in the appended claims.

In the drawings,

Fig. 4 is a view of the construction shown in Fig. 1, looking from the right in said figure.

Figure 1:
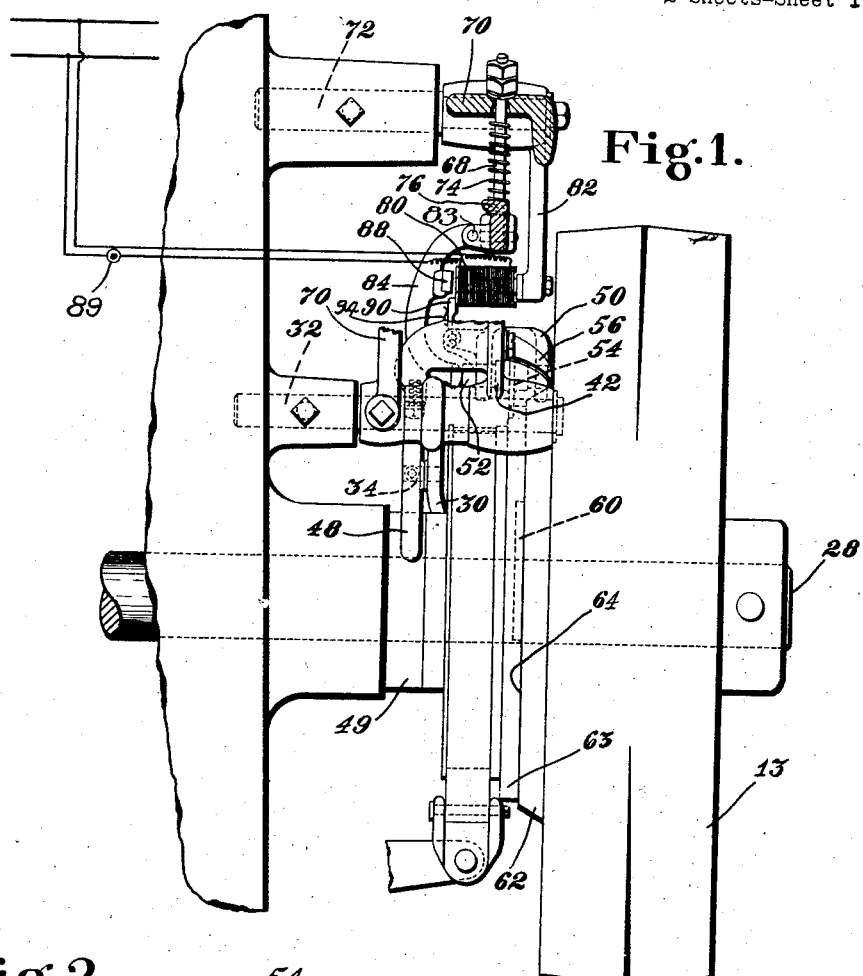
Figure 1 is a view in elevation and partly in section of one embodiment of the invention.
Figure 3:
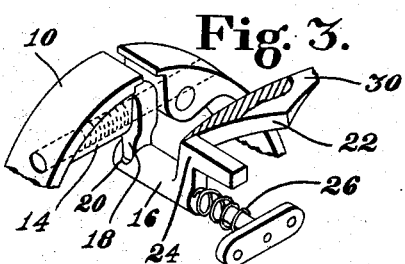
Fig. 3 is a detail view of part of the clutch mechanism.

As before stated, the invention is illustrated in connection with a one-revolution, non-repeating type of clutch which, in the construction shown, comprises a two-part ring or annular member 10, the parts of which are arranged to be pressed apart and into firm contact with the inside of a flange 62 of a pulley 13 by means of a screw threaded member 14 located between the adjacent ends of the annular member 10 and arranged to be rotated by means of a sliding bolt 16 connected to the screw threaded member by means of an arm 18 rigidly connected to the latter and having its free end receivable in a slot 20 in the bolt. It will be understood that, when the bolt 16 is moved to the right in Fig. 3 through engagement of a cam or wedge member 22 with a projection or abutment 24 on the bolt, the screw threaded member 14 rotated through a relatively small arc by which it is screwed into one end of the annular member 10 so as to permit approaching movement of the two ends of the annular member with respect to each other, thus disengaging said annular clutch member from the inside of the flange 62 of the power pulley, whereas movement of the bolt 16 in the opposite direction due to expansion of a spring 26 causes rotation of the screw threaded member 14 in a direction to separate the end portions of the annular member 10 and force them into firm contact with the inside of the flange 62, thereby clutching a shaft 28 to the pulley 13. Referring to Figs. 1 and 4, it will be observed that the cam member 22 is carried at the end of a clutch operating member 30 pivoted upon a stud 32 fixedly carried by a portion of the frame of the machine. Pivoted upon the member 30 at 34 is a latch member 36 carrying at its upper end a plate 38 having a projecting shoulder at 40. Secured to a lever 42, also loosely pivoted upon the stud 32 is a plate 44 having a projection to engage under the shoulder 40 of the plate 38, the end of the plate 44 being beveled so as to pass by the shoulder 40 on downward movement of the lever 42 during which the latch 36 swings on its pivot to permit reengagement of the plate 44 on the lower surface of the shoulder 40. It will be clear that upon lifting the clutch lever 42 the member 30 will be carried upwardly by reason of engagement of the plate 44 beneath the shoulder 40 and that in this way the cam or wedge 22 is withdrawn from in front of the projection 24 on the bolt 16, permitting the bolt to be actuated by the spring 26 to cause clutching of the parts, whereby the shaft 28 is caused to rotate with the power pulley 13. It is obvious that the clutch parts would remain engaged indefinitely as long as the cam member 22 is held upwardly in its inoperative position. In order to insure that the clutch will be thrown out at the end of one revolution of the shaft a cam projection (not shown) is provided on a sleeve 49, a rotatable part of the shaft 28, for striking a tail portion 48 of the latch 36, thus moving the plate 38 to the right (Fig. 4) away from the plate 44 and causing unlatching of the member 30 from the member 42, whereupon the member 30 drops by gravity and the wedge or cam 22 thereof is interposed in the path of the projection 24 on the bolt 16 so as to retract the bolt at the end of one revolution. As thus far described, the clutch parts are identical with those shown in United States Letters Patent No. 1,011,903, granted Dec. 19, 1911, upon an application filed by Arthur Bates. For a more complete disclosure of this special type of clutch reference may be had to the said patent.

Figure 2:
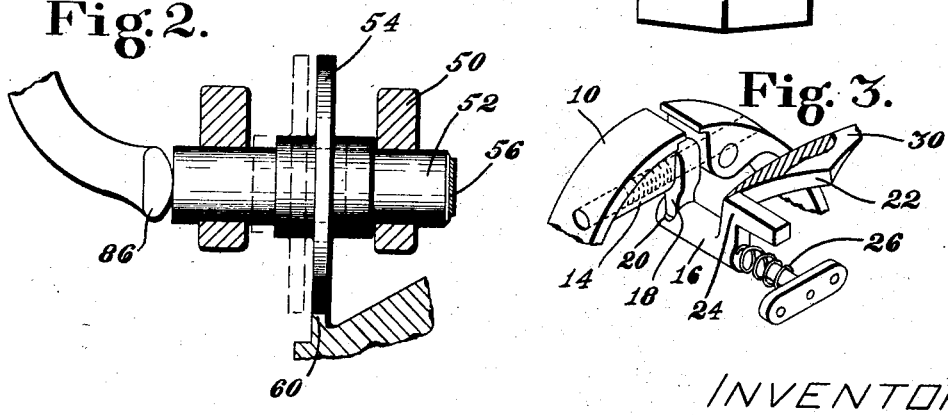
Fig. 2 is a detail showing the operative connection between the clutch operating lever and the cam on the power pulley.

In the illustrative construction the clutch lever 42 is provided with a bifurcated portion 50 to provide bearings for a shaft 52 which carries a wheel or roll 54 rotatable within the bifurcated portion of the lever, means being provided in the form of a spring 56 to keep the wheel or roll 54, which is attached to its shaft 52 for lateral movement therewith, normally over against the left fork of the bifurcation, as indicated in dotted lines in Fig. 2 of the drawings. In this position of the wheel or roll 54, it does not engage with any part or surface of the power pulley 13. If, however, the shaft 52 and the wheel 54 be moved over to the right, as shown in the full line position of the wheel or roll 54 in Fig. 2, the latter will be in position to be engaged by a cam 60 on a peripheral portion 63 of the power pulley 13, a frusto-conical portion 62 of the pulley having the reduced part 63 so that the wheel or roll 54 may be moved laterally at any time to place it in the path of the cam, excepting when the cam itself prevents such lateral movement. A wall or flange 64 between the surfaces 62 and 63 may serve to prevent overthrow of the wheel or roll 54 at the time it is suddenly projected to the right (Fig. 2) into the path of the cam 60, the projecting means and the spring 56 insuring the proper operative engagement of the roll or wheel with the cam as the former travels along the latter. It will be understood that, when the clutch lever 42 is lifted through the operation of the cam 60 on the roll or wheel 54 carried by the lever 42, the cam or wedge 22 is withdrawn from in front of the projection 24 on the bolt 16 and the latter is at once shot into place by the spring 26 to cause clutching engagement of the clutch parts, whereby the shaft 28 is operatively connected to the power pulley 13. Pivoted to the upper end of the clutch lever 42 at 66 is a link 68, the other end of which passes loosely through an opening in a bracket 70 carried at one end by the stud 32 and at its other end by a stud 72 fixedly carried by a fixed part of the machine frame. Surrounding the link 68 is a spring 74 which extends from an abutment 76 at the lower end of the link 68 to a plane slightly below the under surface of the bracket 70, the purpose of the spring being yieldingly to limit the movement of the clutch lever 42 as it is thrown upwardly at the time the wheel 54 rises on the cam 60.

The means for conditioning the clutch operating parts so that they will be operated from the moving power pulley 13 is embodied in a means for projecting the roll 54 into position to be operated by the pulley 13 and comprises, in the illustrated construction, an electro-magnetic device comprising a magnet 80 arranged to be energized from any suitable source of electrical energy. As shown, the magnet 80 is carried fixedly upon a downward extension 82 of the bracket 70. Pivotally connected to an upper arm portion of the clutch lever 42 by a pivot pin 83 is a lever 84 having an end portion 86 arranged to contact with one end of the shaft 52, namely, that end of the shaft opposite to the end pressed upon by the spring 56. Since the shaft 52 is pivoted in a bifurcated portion 50 of the clutch lever 42, and the lever 84 is also pivoted to the clutch lever 42, the lower end 86 of the lever 84 remains constantly in contact with the shaft 52, the force of gravity being sufficient ordinarily for this purpose. Midway of its ends the lever 84 is provided with a cross bar 88 which, upon electrification of the magnet 80, becomes the armature plate of said magnet and is attracted to and firmly held by the magnet. This movement of the lever 84 due to the electrification of the magnet results in endwise movement of the shaft 52 to the right in Fig. 2 with the result that the roll or wheel 54 is moved to solid-line position where it will be operated by the cam 60 on the power pulley 13. As pointed out above, the lifting of the roll or wheel 54 and of the clutch lever 42 results in withdrawing the cam or wedge 22 from in front of the projection 24 on the bolt 16 (Fig. 3) following which the bolt is operated by the spring 26 and the shaft 28 is clutched to the power pulley 13. Almost immediately after the clutching operation takes place, the tail 48 of the latch 36 is struck by the projection on the sleeve 49, thus releasing the clutch member 30 so that the wedge 22 drops into place to cam out the bolt 16 by contact with the projection 24 thereof, as will be understood by reference to Fig. 3, so that only one revolution of the shaft takes place upon throwing in the switch 89 which may be located in any convenient place on the machine frame.

Means is preferably provided for insuring that but one revolution of the shaft will take place even should the operator carelessly or inadvertently maintain the circuit closed over time by pressure upon the press button or switch 89. It will be understood that when the clutch lever 42 is raised by the roll or wheel 54 running up on the cam 60 that the armature bar 88 is moved upwardly and almost displaced from contact with the end of the magnet 80 so that the spring 56 becomes relatively strong enough to shove the shaft 52 to the left, whereby the roll or wheel 54 is moved to dotted-line position in Fig. 2, thus removing it from the path of the cam 60. This would be the operation of the parts if the operator should press the button or otherwise momentarily operate the switch and then release the same promptly. If, however, the operator should maintain pressure on the push button or otherwise keep the circuit closed, it is clear that as soon as the clutch lever 42, together with the parts carried thereby, drops to the lowermost position of these parts that the lever 84 will again be moved toward the right in Fig. 1 because of the attraction of the magnet on the bar 88 and that a repetition of the cycle of the machine would be likely to take place. To prevent this happening means is provided in the illustrative construction for holding the clutch lever 42 raised, so long as the circuit remains closed, in the position to which it has been moved upon first closing the circuit. In other words the clutch lever 42 is not allowed to drop, so as to re-engage the plate 44 underneath the shoulder 40 on the plate 38, and to rise again, and hence the wedge 22 remains in position to cam out the bolt 16. As shown, the means referred to comprises a second armature member 90 pivoted at its lower end at 92 (Fig. 4) to the member 42 so that it rises as the latter member is lifted by the roll or wheel 54. It will be clear, then, from an inspection of Fig. 1 that both armature bars 88 and 90 rise and fall simultaneously and that, as the bar 88 is moving upwardly out of the field of the magnet, the second armature 90 is entering this field and finally takes the place of the armature 88. Since the magnet 80 is strong enough to hold the armature 90 against displacement by the clutch lever 42, due to the weight of the latter, the clutch lever is held up and not allowed to drop so long as the circuit is maintained closed by the operator, and hence no repetition of the clutching operation can take place while the circuit remains closed, thereby insuring that there will be no repetition of the cycle upon a single sustained pressure upon the push button which closes the circuit. As shown, the armature 90 is held pressed against the end of the magnet 80 by a spring 94.

It will be clear that in the operation of the device the magnet is not called upon to lift the clutch parts to initiate a clutching of the shaft to the power pulley, but that this work is performed through power furnished by the moving power pulley itself when the cam 60 lifts the roll or wheel 54 carried at the end of the clutch lever 42. When it is desirable to provide means for preventing a repetition of the clutching operation, where carelessness or inadvertence on the part of the operator might result in injury to himself or damage to the work, means is provided, as above described, for preventing a repetition in case the switch is held closed too long, and in such a case the magnet must be strong enough to hold the clutch lever 42 or a corresponding part in raised, inoperative position. It will be understood that the skilled operator will ordinarily press and release the push button, or otherwise close and open the switch, with such well-timed and precise movements of the hand that the operation of the magnet as a supporting means for the clutch lever 42 is not required. Hence the work performed by the magnet will ordinarily be limited to moving the lever 84 and the relatively small and light roll or wheel 54—an operation which involves the use of a relatively small amount of energy working through very short periods of time, so that the operating expense of the device is almost negligible.

Having described my invention, what I claim as new and desire to secure by Letters Patent of the United States is:—

1. In a mechanism of the character described, a shaft, a power pulley, means for clutching the shaft to the power pulley comprising means for causing the power pulley to actuate the clutching means, and means automatically operative for preventing the power pulley from repeating the clutching operation.

2. In a mechanism of the character described, a shaft, a power pulley on the shaft, means for clutching the power pulley to the shaft comprising a spring-pressed bolt, a clutch member operative normally to hold the bolt in inoperative, non-clutching position, means on the power pulley for lifting the clutch member to release the bolt, a movable member serving operatively to connect the power pulley and said clutch member, means under the control of the operator for moving the movable connecting member into position to be operated by the means on the power pulley, and subsequently-acting means for holding the movable connecting member in inoperative position until the operator releases the moving means under his control.

3. In a mechanism of the character described, a shaft, a power pulley rotatable on the shaft, a clutch for operatively connecting the power pulley to the shaft, a clutch member for holding the clutch parts in inoperative position, means movable with the power pulley for moving said member to clutch releasing position a magnet for controlling said means at the will of the operator, and means also controlled by the magnet for preventing unintentional repetition of the clutching operation.

4. In a mechanism of the character described, a shaft, a power pulley rotatable on the shaft, a clutch for operatively connecting the power pulley to the shaft, a member for holding the clutch disconnected, means on the power pulley for moving the said member to inoperative position, whereupon clutching of the pulley to the shaft takes place, means for controlling said last-mentioned means at the will of the operator, means operative to release the member early in the revolution of the shaft so that disconnection of the clutch takes place at the end of one revolution of the shaft, and means for preventing repetition of the clutching operation following a single operation of the controlling means.

5. In a mechanism of the character described, a shaft, a power pulley rotatable on the shaft, a clutch for operatively connecting the pulley to the shaft, a member for holding the clutch in disconnected or inoperative position, a cam movable with the pulley for moving said member to clutch releasing position, means under the control of the operator for rendering said cam on the pulley operative for the purpose stated, and means automatically operative to prevent a repetition of the clutching operation in case the operator controlled means be held in operation beyond the time necessary to effect one clutching operation.

6. In a mechanism of the character described, a shaft, a pulley rotatable on the shaft, a clutch for operatively connecting the pulley to the shaft, a member for holding the clutch in disconnected or inoperative position, a cam on the pulley for operating said member to move it to inoperative or clutch releasing position, and electrical means for controlling the cam to effect this movement of the clutch member.

7. In a mechanism of the character described, a shaft, a power pulley on the shaft, a clutch for operatively connecting the pulley to the shaft, a clutch member for holding the clutch in disconnected or inoperative position, a cam on the pulley, a member movable with relation to the clutch member for co-operating with the cam to lift the clutch member to inoperative position, and a magnet controlled by the operator for positioning said member in the path of the cam.

8. In a mechanism of the character described, a shaft, a pulley rotatable on the shaft, a clutch for operatively connecting the pulley to the shaft comprising a spring-pressed bolt operative to throw in the clutch, a clutch lever normally adapted to retain the bolt in inoperative position, a member operatively connected to the clutch lever and movable to initiate a clutching operation, a cam on the pulley, a roll carried by said member, and means under the control of the operator for moving the roll into the path of the cam whereby said member is operated to effect a clutching of the pulley to the shaft.

9. In a mechanism of the character described, a shaft, a pulley, a one-revolution clutch for operatively connecting the pulley to the shaft, means on the pulley for effecting the throwing in of the clutch, means under the control of the operator for controlling said means on the pulley, and means for maintaining control of the clutching operation so that the clutch will be effective for a single revolution only of the shaft, upon a single operation of the operator controlled means irrespective of the length of time the latter may be maintained in action.

10. In a mechanism of the character described, a shaft, a pulley on the shaft, clutching means for operatively connecting the pulley to the shaft, a clutch member for retaining the clutching means in inoperative position, a cam on the pulley for operating the clutch member to inoperative position so that the clutch may be thrown in to cause connection of the pulley and shaft, and electrical means for causing the co-operation of the clutch member and the cam on the pulley.

11. In a mechanism of the character described, a shaft, a pulley on the shaft, clutching means for operatively connecting the pulley to the shaft, a clutch member for retaining the clutching means in inoperative position, a cam on the pulley for operating the clutch member to inoperative position so that the clutch may be thrown in to cause connection of the pulley and shaft, electrical means for causing the cooperation of the clutch member and the cam on the pulley, and means for preventing repetition of the clutching operation in the event that the circuit of the electrical means is kept closed.

12. In a mechanism of the character described, a shaft, a pulley on the shaft, a clutch for operatively connecting the pulley to the shaft, a clutch member for retaining the clutching means in inoperative position, a cam on the pulley for moving the clutch member to inoperative position to release the clutching means, a connection between the cam and said clutch member and movable for operatively connecting said cam and clutch member, and a magnet under the control of the operator for effecting said movement of the connection.

13. In a mechanism of the character described, a shaft, a pulley on the shaft, a clutch for operatively connecting the pulley to the shaft, a clutch member for retaining the clutching means in inoperative position, a cam on the pulley for moving the clutch member to inoperative position to release the clutching means, a connection between the cam and said clutch member and movable for operatively connecting said cam and clutch member, a magnet under the control of the operator for effecting said movement of the connection, and means arranged to be operated by the magnet for preventing repetition of the clutching operation even though the operator maintains the magnet energized by keeping the circuit closed.

14. In a mechanism of the character described, a shaft, a power pulley rotatable on the shaft, a clutch for operatively connecting the pulley to the shaft, a clutch member for maintaining the clutch in inoperative position, an electromagnet under the control of the operator, a cam on the power pulley, a connecting member for operatively connecting the cam on the power pulley with said clutch member to cause movement of the latter to inoperative position to effect release of the clutch, said connecting member being operated by the magnet, and means also operated by the magnet for preventing repetition of the clutching operations so long as the magnet is maintained energized.

15. In a mechanism of the character described, a power pulley, a shaft, a clutch for operatively connecting the pulley to the shaft, a clutch member for retaining the clutch in inoperative position, a clutch lever for lifting the clutch member to inoperative position to effect release of the clutch, a cam on the pulley for operating the clutch lever, a roll carried by the clutch lever, a magnet for moving the roll into the path of the cam on the pulley so that the clutch lever is raised by power furnished by the pulley to initiate the throwing-in of the clutch, and means operated by the magnet for retaining the clutch lever in its raised position so long as the circuit is kept closed by the operator so that no repetition of the clutching operation can take place.

16. In a mechanism of the character described, a shaft, a power pulley rotatable on the shaft, a one-revolution clutch for operatively connecting the pulley to the shaft, operative connections between the pulley and the clutch for operating the clutch, and an electro-magnet under the control of the operator and provided with an armature in two parts, one part being operative for bringing the operative connections into cooperative relation with the power pulley and the clutch for a part only of a single revolution of the pulley, and the second part of the armature being operative to prevent re-establishment of the connections while the circuit is kept closed, thus insuring against unintentional repetition of the clutching operation.

17. In a mechanism of the character described, a shaft, a pulley on the shaft, a one-revolution clutch for operatively connecting the pulley to the shaft, and a magnet under the control of the operator for controlling the clutch to initiate clutching of the pulley to the shaft and providing for only one operation of the clutch during a single closing of the magnet circuit.

18. In a mechanism of the character described, a shaft, a pulley rotatable on the shaft, a clutch for operatively connecting the pulley to the shaft, a cam on the pulley for causing operation of the clutch, a magnet in an electrical circuit for controlling the cam on the pulley and means operated by the magnet for preventing repetition of the clutching operation during a single closing of the circuit.

19. In a mechanism of the character described, a shaft, a pulley rotatable on the shaft, a clutch for operatively connecting the pulley to the shaft, means on the pulley for causing operation of the clutch, operative connections between said means and the clutch so that the pulley furnishes the power for operating the clutch, a magnet for controlling said connections, and a member controlled by the magnet for preventing repetition of the clutching operation during the period of the single closing of the circuit.

20. In a mechanism of the character described, a shaft, a power pulley mounted on the shaft, a clutch for connecting the pulley to the shaft, a clutch lever normally operable to retain the pulley disconnected from the shaft, a member operatively connected to the clutch lever for moving the lever to inoperative position, a means operated by the pulley for moving said member to effect a clutching operation, and means operated by the pulley for disconnecting the clutch lever from said member to effect the unclutching of the pulley from the shaft.

21. In a mechanism of the character described, a shaft, a power pulley, a clutch for connecting the pulley to the shaft, a clutch lever normally operable to maintain the pulley disconnected from the shaft, a lever operatively connected to the clutch lever and adapted to move the clutch lever into inoperative position, a slidable member mounted on the second-mentioned lever, means under control of the operator for operatively connecting said member and the pulley whereby the pulley initiates a clutching operation, and means for disconnecting the clutch lever from the said second-mentioned lever whereby unclutching of the pulley from the shaft is effected.

22. In a mechanism of the character described, a shaft, a power pulley, a clutch for connecting the pulley to the shaft, a clutch lever normally operable to maintain the pulley disconnected from the shaft, a lever operatively connected to the clutch lever and adapted to move the clutch lever into inoperative position, a slidable member mounted on the second-mentioned lever, and means under control of the operator for operatively connecting said member and the pulley whereby the pulley initiates a clutching operation.

23. In a mechanism of the character described, a shaft, a power pulley, a clutch for operatively connecting the power pulley to the shaft, a clutch operating lever, a member for initiating clutching operations, a latch forming a connection between the clutch operating lever and said member, pulley operated means under the control of the operator for actuating said member to effect a clutching of the pulley to the shaft, and means for releasing the latch to disconnect the clutch operating lever from said member to effect the unclutching of the pulley from the shaft.

24. In a mechanism of the class described, a shaft, a power pulley rotatable on the shaft, a cam on the periphery of the pulley means for clutching the power pulley to the shaft comprising a member movable to initiate the clutching operation, a roll movable on the member into and out of operative relation to the cam, manually controllable means for causing the roll to move into operative relation to the cam thereby effecting a clutching of the pulley to the shaft, and means for preventing a repetition of the clutching operation during a single sustained operation of the manually controllable means.

25. In a mechanism of the character described, a shaft, a power pulley on the shaft, a clutch for connecting the pulley to the shaft, a member for causing operation of the clutch, a light member for connecting the first-mentioned member to the pulley so that the latter furnishes the power to effect a clutching operation, manually controllable means for moving the light member to its operative position, and subsequently acting means for holding the light member in inoperative position until the operator releases the moving means under his control.

In testimony whereof I have signed my name to this specification.

MILTON H. BALLARD.